United States Patent
Jia et al.

(10) Patent No.: US 10,314,105 B2
(45) Date of Patent: Jun. 4, 2019

(54) COMMAND FOR EXTENDED IDLE MODE DISCONTINUOUS RECEPTION

(71) Applicant: AT&T Intellectual Property I, L.P., Atlanta, GA (US)

(72) Inventors: Yupeng Jia, Austin, TX (US); Inderpreet Ahluwalia, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 38 days.

(21) Appl. No.: 15/599,171

(22) Filed: May 18, 2017

(65) Prior Publication Data
US 2018/0338333 A1    Nov. 22, 2018

(51) Int. Cl.
| | |
|---|---|
| *H04W 4/70* | (2018.01) |
| *H04W 24/08* | (2009.01) |
| *H04W 52/02* | (2009.01) |
| *H04W 76/28* | (2018.01) |

(52) U.S. Cl.
CPC ............ *H04W 76/28* (2018.02); *H04W 4/70* (2018.02); *H04W 24/08* (2013.01); *H04W 52/0216* (2013.01); *H04W 52/0219* (2013.01); *H04W 52/0229* (2013.01); *Y02D 70/00* (2018.01)

(58) Field of Classification Search
CPC ..... H04W 76/28; H04W 4/70; H04W 52/287; H04W 52/0216
See application file for complete search history.

(56) References Cited

U.S. PATENT DOCUMENTS

| | | |
|---|---|---|
| 5,481,598 A | 1/1996 | Bergler et al. |
| 5,920,824 A | 7/1999 | Beatty et al. |
| 5,920,825 A | 7/1999 | Patel et al. |
| 5,931,928 A | 8/1999 | Brennan et al. |
| 6,055,443 A | 4/2000 | Exner et al. |
| 6,323,962 B1 | 11/2001 | Itoh et al. |
| 6,433,512 B1 | 8/2002 | Birkler et al. |

(Continued)

FOREIGN PATENT DOCUMENTS

| | | |
|---|---|---|
| JP | 0951396 A | 2/1997 |
| WO | 2016114698 A1 | 7/2016 |

(Continued)

OTHER PUBLICATIONS

US 9,615,364 B2, 04/2017, Kim et al. (withdrawn)

(Continued)

*Primary Examiner* — Redentor Pasia
(74) *Attorney, Agent, or Firm* — Amin, Turocy & Watson, LLP

(57) ABSTRACT

Various embodiments disclosed herein provide for sending queries and commands related to an extended idle mode discontinuous reception operation (eIDRX). There are vendor and manufacturer specific mechanisms for determining the eIDRX parameters of different, but there is currently not a network wide, standardized protocol for sending AT commands relating to eIDRX for device. In an embodiment, standardized eIDRX protocol can enable a mobile network to query a device to determine the current eIDRX mode and parameters, to query the device about the list/range of supported parameters, and to program the device to start using a new eIDRX parameter.

20 Claims, 10 Drawing Sheets

(56) References Cited

U.S. PATENT DOCUMENTS

| | | | |
|---|---|---|---|
| 6,917,817 | B1 | 7/2005 | Farrow et al. |
| 7,082,312 | B2 | 7/2006 | Zhang et al. |
| 7,423,999 | B2 | 9/2008 | Tailor |
| 8,724,179 | B2 | 5/2014 | Kang et al. |
| 8,767,630 | B1 | 7/2014 | Collins et al. |
| 8,942,181 | B2 | 1/2015 | Collins et al. |
| 9,603,097 | B2 | 3/2017 | Bhattacharjee et al. |
| 2015/0169033 | A1 | 6/2015 | Shukla et al. |
| 2015/0319734 | A1* | 11/2015 | Zhang ............... H04W 68/005 455/458 |
| 2015/0358841 | A1* | 12/2015 | Wang ............... H04W 24/08 455/458 |
| 2016/0044605 | A1 | 2/2016 | Vajapeyam et al. |
| 2016/0057701 | A1* | 2/2016 | Choi ............... H04W 76/28 370/311 |
| 2016/0057738 | A1* | 2/2016 | Lee ............... H04W 52/0216 370/329 |
| 2016/0205622 | A1* | 7/2016 | Ronneke ............... H04W 52/0203 370/311 |
| 2016/0234670 | A1 | 8/2016 | Zhang et al. |
| 2016/0242231 | A1* | 8/2016 | Vajapeyam ............... H04W 24/08 |
| 2017/0105192 | A1* | 4/2017 | Tiwari ............... H04W 24/02 |
| 2017/0325163 | A1* | 11/2017 | Haneji ............... H04W 52/0229 |
| 2017/0332431 | A1* | 11/2017 | Kim ............... H04W 76/028 |
| 2018/0091993 | A1* | 3/2018 | Siomina ............... H04W 24/10 |
| 2018/0103427 | A1* | 4/2018 | Griot ............... H04W 52/0216 |

FOREIGN PATENT DOCUMENTS

| | | |
|---|---|---|
| WO | 2017009053 A1 | 1/2017 |
| WO | 2017050481 A1 | 3/2017 |
| WO | 2017076610 A1 | 5/2017 |

OTHER PUBLICATIONS

Orstad, et al. "End-to-end key performance indicators in cellular networks." MS thesis. HØgskolen i Agder, 2006, 99 pages.

Pauls, et al. Friedrich, et al. "Evaluation of Efficient Modes of Operation of GSM/GPRS Modules for M2M Communications." Vehicular Technology Conference (VTC Fall), 2013 IEEE 78th. IEEE, 2013, 6 pages.

Li, et al. Yuanjie, et al. "iCellular: Define Your Own Cellular Network Access on Commodity Smartphones." arXiv preprint arXiv:1510.08027, 2015, 14 pages.

Li, et al. "iCellular: Define Your Own Cellular Network Access on Commodity Smartphones." Usenix the advanced computing Systems Association, 2016, 15 pages.

Mir, "Perpetual battery life for Machine to Machine communication devices with cellular access." Diss. AALTO University, 2013, 74 pages.

* cited by examiner

US 10,314,105 B2

COMMAND FOR EXTENDED IDLE MODE DISCONTINUOUS RECEPTION

TECHNICAL FIELD

The present application relates generally to the field of mobile communication and, more specifically, to implementation of commands for extended idle mode discontinuous reception operation in a wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming narrowband internet of things (IOT) and Category M1 devices on next generation networks.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
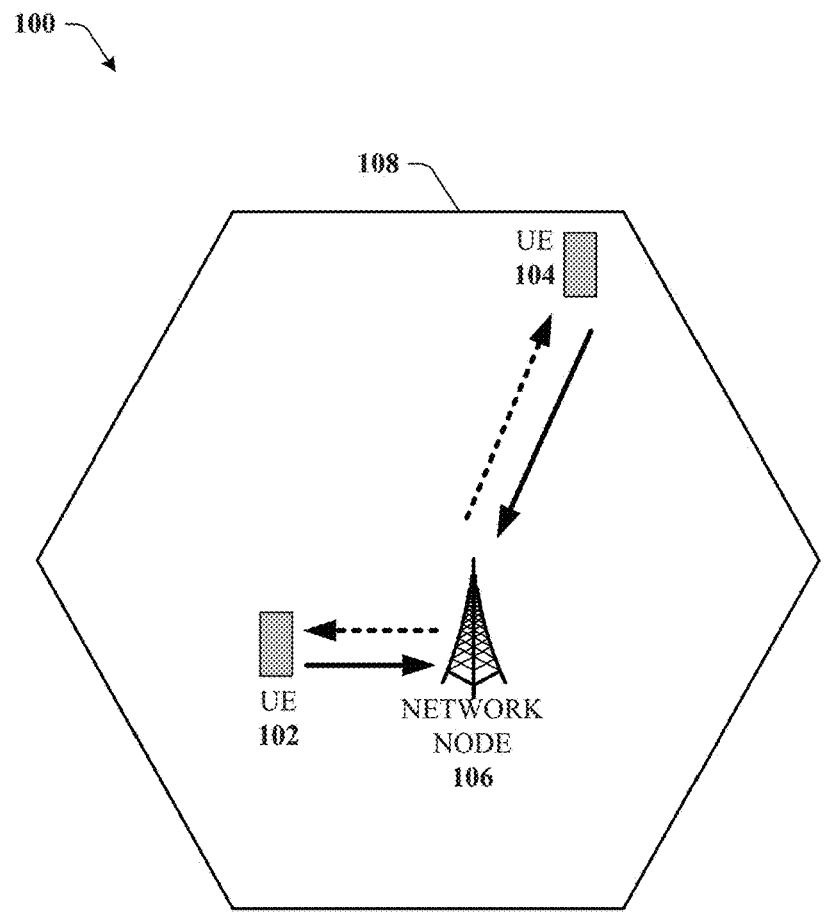
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a system can comprise a processor and a memory that stores executable instructions that, when executed by the processor facilitate performance of operations. The operations can comprise sending a first extended discontinuous reception command to a device on a network, the first extended discontinuous reception command comprising a first request for a group of supported extended discontinuous reception parameters. The operations can also comprise sending a second extended discontinuous reception command to the device on the network, the second extended discontinuous reception command comprising a second request for a current extended discontinuous reception parameter. The operations can also comprise sending a third extended discontinuous reception command to the device on the network, the third extended discontinuous reception command comprising a command to implement a new extended discontinuous reception parameter of the group of supported extended discontinuous reception parameters to replace the current extended discontinuous reception parameter.

In another embodiment, method comprises facilitating, by a base station device of a network and comprising a processor, transmitting a first command to a device connected to the network, the first request comprising a first command to provide a list of supported extended discontinuous reception parameters to the base station device. The method can also comprise facilitating, by the base station device, transmitting a second command to the device, the second command comprising a second request to provide a current extended discontinuous reception parameter of the device to the base station device. The method can also comprise facilitating, by the base station device, transmitting a third command to the device for the device to implement a new extended discontinuous reception parameter, wherein the first command, the second command, and the third command are associated with a mobile network extended discontinuous reception standard that is operable for narrow band devices on the network.

In another embodiment machine-readable storage medium, comprising executable instructions that, when executed by a processor of a device, facilitate performance of operations. The operations can comprise receiving from a base station device a first request for supported extended discontinuous reception parameters. The operations can also comprise transmitting to the base station device the supported extended discontinuous reception parameters. The operations can also comprise receiving from the base station device a second request for a current extended discontinuous reception parameter. The operations can also comprise transmitting to the base station device the current extended discontinuous reception parameter. The operations can also comprise receiving a first command to implement a new extended discontinuous reception parameter, wherein the first request, the second request, and the first command conform to a standardized protocol for extended discontinuous reception instructions.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber 15599171 tation," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Various embodiments disclosed herein provide for sending queries and commands related to an extended idle mode discontinuous reception operation (eIDRX). There are vendor and manufacturer specific mechanisms for determining the eIDRX parameters of different devices, but there is currently not a network wide, standardized protocol for sending AT commands relating to eIDRX for device. In an embodiment, standardized eIDRX protocol can enable a mobile network to query a device to determine the current eIDRX mode and parameters, to query the device about the list/range of supported parameters, and to program the device to start using a new eIDRX parameter.

One mechanism used to save user equipment (UE) power in LTE and advanced LTE cellular networks is discontinuous reception (DRX). There are two types of DRX in LTE, one is idle mode DRX, this idle mode DRX is more commonly known as paging cycle. The other type is connected mode DRX, which is out of the scope of this invention. With idle mode DRX, a UE can be configured to turn at least part of its circuitry off during a DRX period to save power. During the DRX period, the network should not try to contact the UE, so the UE does not need to listen for the paging messages or downlink control channels used by the network to reach the UE. Accordingly, the UE turns off its transmitter and receiver for defined intervals, referred to as DRX periods. Between DRX periods, the UE can turns on its receiver for a short paging period. The initial DRX operating parameters limit the longest possible DRX period to 2.56 seconds. The 3GPP Release 13 specification improves upon the original DRX mode by introducing an extended idle mode DRX (eIDRX). eIDRX allows a UE to extend the duration of respective DRX periods during idle mode beyond a previous DRX period limit of 2.56 seconds up to 43.69 minutes and up to 2.9 hours for NB-IoT.

There is currently no standard mechanism defined in 3GPP to enable or disable eIRDX or to even check the status eIDRx feature. For lab and field testing of this feature we have to rely on vendor specific commands to enable/disable eIDRX which are proprietary in nature. To resolve the issues listed above, we have defined AT commands to display the eIDRX status and also to allow testers to control the setting of the UEs eIDRX parameters. The command controls whether the UE wants to apply eIDRX or not, as well as the requested Paging Time Window (PTW) and eIDRX cycle value.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

The network node can also enable narrow band networks including narrowband (NB) IOT networks, and 3GPP Category M1 networks and devices. In various embodiments, UE 102 and 104 can also be devices other than mobile devices, such as wearable devices, embedded devices in televisions, water meters, refrigerators, and other home appliances and industrial systems, sensors, and any other devices that are low throughput and low latency devices.

Figure 2:
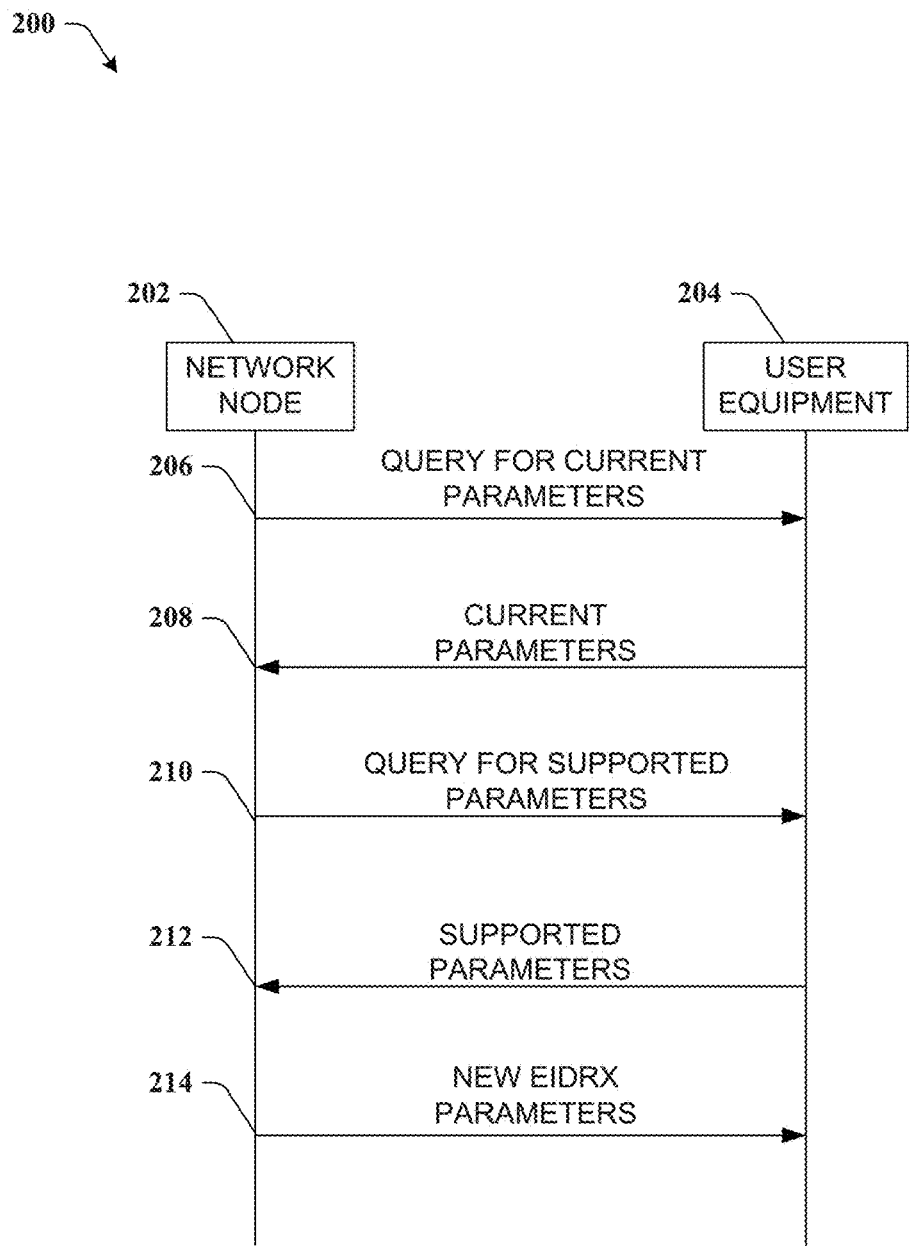
FIG. 2 illustrates an example block diagram showing a message sequence chart in accordance with various aspects and embodiments of the subject disclosure.

Turning now to FIG. 2, illustrated is an example block diagram 200 showing a message sequence chart in accordance with various aspects and embodiments of the subject disclosure.

It is to be appreciated that the message sequence chart described herein is merely exemplary, and in other embodiments of this disclosure, the sequence of the messages, queries and commands can be different, and various sequences may not include each of the queries and commands described here. For instance, while in the embodiment, described herein, the query for current parameters 206 is shown occurring before the command for new eIDRX parameters 214, in other embodiments, the network node 202 can issue the new eIDRX parameters without first querying the user equipment 204 with either the current parameters at 206 or the list of supported parameters at 210.

In an embodiment, the query for current parameters 206 can be sent by the network node 202 to user equipment 204 and in response, the UE 204 can return the current parameters at 208. The request for current parameters 206 can be in the format of other network AT commands, where the query +PAEIDRX? is sent to the UE 204. The UE 204 can return the current parameters at 208 in the format of "+PAEIDRX: <mode>,[<Requested_Paging-Time-Window>],[<Requested_eIDRX-Parameter>]", where the <mode> indicates whether eIDRX is enabled, <Requested_Paging-Time-Window> indicates the paging time window parameter, or the length of the window, in frames, hyperframes, or seconds that the UE 204 will power up to receive transmissions from the network node 202, and the <Requested_eIDRX-Parameter> which is the cycle length of the DRX cycle, from paging window to paging window.

The query for supported parameters 210 can similarly be in the format of other AT commands where the query+PAEIDRX=? is sent to the UE 204. The UE 204 can return the list of supported parameters at 212 in the format: +PAEIDRX: (list of supported <mode>s), (list of supported <Requested_Paging_Time_Window>s), (list of supported <Requested_EIDRX-Parameter>s), where (list of supported <mode>s) indicates the possible modes supported by the device, (list of supported <Requested_Paging_Time_Window>s) indicates the possible paging timing windows for the device, and the (list of supported <Requested_EIDRX-Parameter>s) indicates the possible eIDRX timing cycles for the device.

The network node 202 can also program the UE 204 with new eIDRX parameters at 214 by sending the command in the following format: "+PAEIDRX=[<mode>[,<Requested_Paging-Time-Window>[,<Requested_eIDRX-Parameter>]]", where the <mode>sets the eIDRX mode, "<Requested_Paging-Time-Window>" sets the Paging Time Window, and "<Requested_eIDRX-Parameter>" sets the cycle length of the eIDRX cycle.

A table of the command syntax is shown here at Table 1:

and the value ranges for the requested paging time window and the requested eIDRX parameter as compound values.

In an embodiment, the parameters can have defined values where the "<mode>" is an integer type. Indication to disable or enable the use of eIDRX in the UE. A "0" can be set to disable the use of eIDRX, and a "1" can enable the use of eIDRX.

The parameter for the paging time window (e.g., <Requested_Paging-Time-Window>) is a string type, with one byte in an 8 bit format. The PTW for LTE and 5G New Radio, including CAT M1 classified devices is between 128 and 2048 seconds, whereas for NB-IOT devices, the PTW is between 256 and 4096 seconds.

The requested paging time window value is coded as bit format (e.g. "01000111" equals 70 hours). For the coding and the value range, it is similar to GPRS Timer 3 IE in 3GPP TS 24.008 Table 10.5.163a/3GPP TS 24.008. See also 3GPP TS 23.682 and 3GPP TS 23.060. The default value, if available, is manufacturer specific.

The parameter for the eIDRX cycle (e.g., <Requested_eIDRX-Parameter>) is also string type, with one byte in an 8 bit format. The eDRX paging cycle (Tedrx) for LTE and 5G NR including CAT M1 device: [5.12 s.-~44 min.], whereas for NB-IOT devices, the cycle length can be between 2-1024 hyperframes which is between around 20 seconds to 3 hours.

The requested eIDRX parameter value is coded as bit format (e.g. "01000111" equals 70 hours). For the coding and the value range, it is similar to GPRS Timer IE in 3GPP TS 24.008Table 10.5.172/3GPP TS 24.008. See also 3GPP TS 23.060. The default value, if available, is manufacturer specific.

Figure 3:
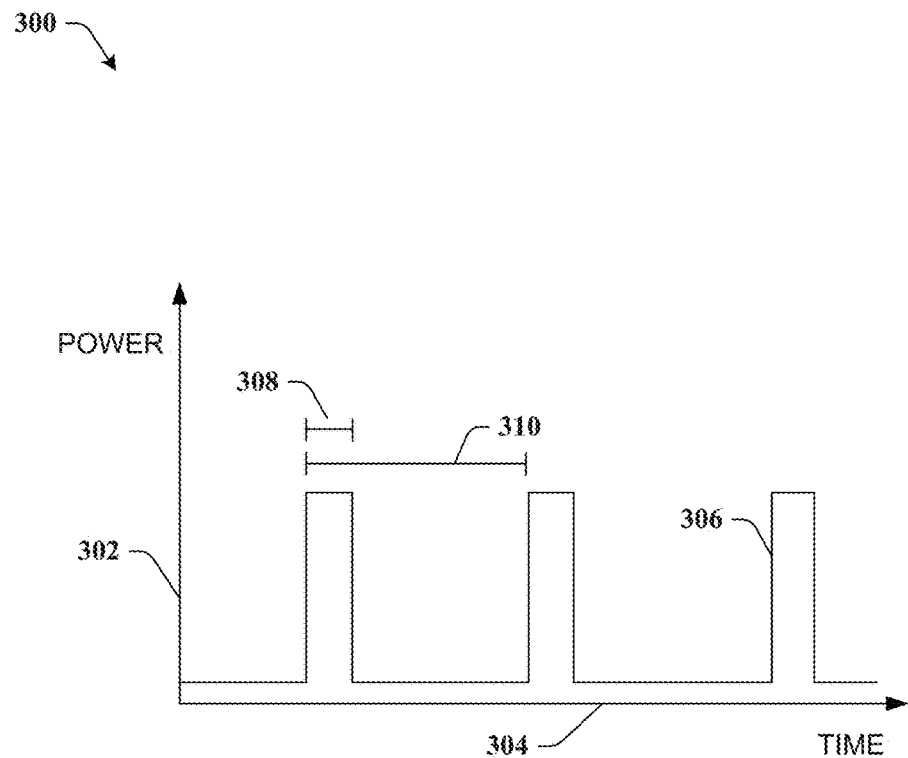
FIG. 3 illustrates an example graph showing power usage during extended idle mode discontinuous reception cycles in accordance with various aspects and embodiments of the subject disclosure.

Turning now to FIG. 3, illustrated is an example graph 300 showing power usage during extended idle mode discontinuous reception cycles in accordance with various aspects and embodiments of the subject disclosure.

The vertical axis 302 shows power as a function of the time axis 304. A spike, such as at 306 represents the paging time window when the device is active and able to receive and send transmissions. The length of the paging time

| Command | Possible response(s) |
|---|---|
| +PAEIDRX=[<mode>[,< Requested_Paging-Time-Window >[,< Requested_eIDRX-Parameter >]] | +CME ERROR: <err> |
| +PAEIDRX? | +PAEIDRX: <mode>,[<Requested_Paging-Time-Window>],[<Requested_eIDRX-Parameter>] |
| +PAEIDRX=? | +PAEIDRX: (list of supported <mode>s),(list of supported <Requested_Paging_Time_Window>s),(list of supported <Requested_EIDRX-Parameter>s) |

The set command controls the setting of the UEs extended idle mode DRX (DRX) parameters. The command controls whether the UE wants to apply eDRX or not, as well as the requested Paging Time Window (PTW) and the requested eIDRX parameter.

A special form of the command can be given as +PAEIDRXS=(with all parameters omitted). In this form, the parameter <mode> will be set to 0, the use of eIDRX will be disabled and data for all parameters in command+PAEIDRXS will be removed or, if available, set to the manufacturer specific default values. The read command (+PAEIDRX?) returns the current parameter values. The test command (+PAEIDRX=?) returns the supported <mode>s window is shown at 308, which is the width of the power spike. Time period 310 represents the length of the eIDRX cycle, or the time between starts of the paging time window 308.

As disclosed above the eIDRX cycle parameter can be between 2-1024 hyperframes, or around 20 seconds to around 3 hours for NB-IOT devices. For CAT M1 devices, the eIDRX cycle parameter is between around 5.12 seconds and around 44 minutes. For paging time windows, the NB-IOT is between 256 and 4096 seconds, whereas for CAT M1 devices, the paging time window is between 128 and 2,048 seconds.

Figure 4:
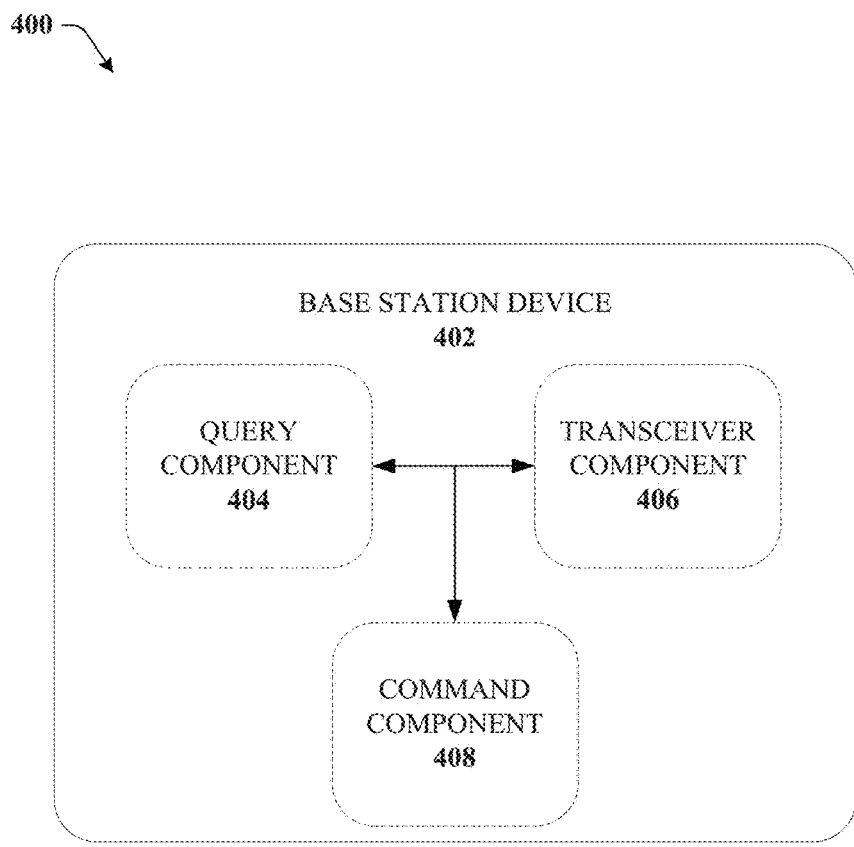
FIG. 4 illustrates an example block diagram of a base station device in accordance with various aspects and embodiments of the subject disclosure.

Turning now to FIG. 4, illustrated is an example block diagram 400 of a base station device 402 in accordance with one or more embodiments of the subject disclosure.

The base station device 402 can include a query component 404 that can send a first extended discontinuous reception command to a device on a network (via the transceiver component 406), the first extended discontinuous reception command comprising a first request to provide a list of supported extended discontinuous reception parameters.

The query component can also send a second extended discontinuous reception command to the device on the network (via the transceiver component 406), the second extended discontinuous reception command comprising a second request to provide a current extended discontinuous reception parameter.

A command component 408 can send a third extended discontinuous reception command to the device on the network (via the transceiver component 406), the third extended discontinuous reception command comprising a command to implement a new extended discontinuous reception parameter.

The transceiver component 406 can receive from the device, a first update from the device in response to sending the first extended discontinuous reception command, the first update comprising the list of supported extended discontinuous reception parameters. The transceiver component 406 can also received from the device, a second update from the device in response to sending the second extended discontinuous reception command, the second update comprising the current extended discontinuous reception parameter.

The list of supported extended discontinuous reception parameters can include a first field comprising information associated with a list of extended discontinuous reception modes, a second field comprising information associated with a list of paging time window parameters, and a third field comprising information associated with a list of extended discontinuous reception time parameters. The list of paging time window parameters can be between 128 seconds and 4,096 seconds and the list of extended discontinuous reception time parameters can be between 5 seconds and 10,800 seconds depending on whether the device is NB-IOT or CAT M1. The current extended discontinuous reception parameter can include at least one of a current extended discontinuous reception mode, a current paging time window, and a current extended discontinuous reception time parameter.

Figure 5:
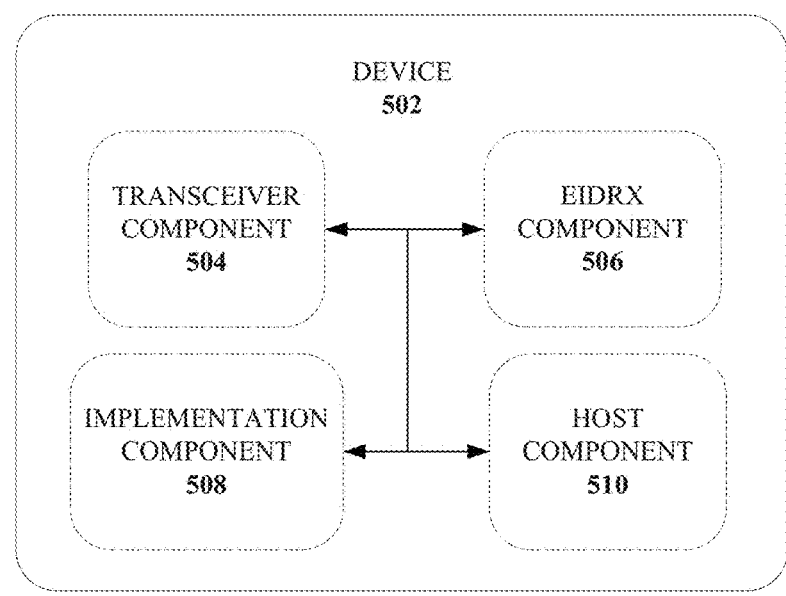
FIG. 5 illustrates an example block diagram of a mobile device in accordance with various aspects and embodiments of the subject disclosure.

Turning now to FIG. 5, illustrated is an example block diagram 500 of a device 502 in accordance with various aspects and embodiments of the subject disclosure.

A transceiver component 504 can receive from the base station a first request for a list of supported extended discontinuous reception parameters. The request can be passed to the EIDRX component 506 that can retrieve the list of supported extended discontinuous reception parameters (based on the device, based on whether it is CAT M1, or NB-IOT, based on the mobile network, etc.), and the transceiver component 504 can transmit to the base station device the retrieved list of parameters.

The transceiver component 504 can also receive from the base station device a second request for a set of current extended discontinuous reception parameters. The request can be passed to the EIDRX component 506 that can retrieve the current extended discontinuous reception parameters which can be transmitted back to the base station device via the transceiver component 504.

The transceiver component 504 can also receive a first command to implement a new set of extended discontinuous reception parameters, wherein the first request, second request, and first command conform to a standardized 3GPP format for extended discontinuous reception instructions. The implementation component 508 can implement the new parameters on the device 502 to control the eIDRX cycle and paging time window of the device 502.

A host component 510 can also be provided to configure a host device based on the instructions and commands implemented by the implementation component 508. For instance, if the device 502 is embedded in another device, and is responsible for passing information between a mobile network and the host device, the host device/application/operating system can be informed of the new eIDRX parameters so as to improve power consumption and processing on the host device.

Figure 6:
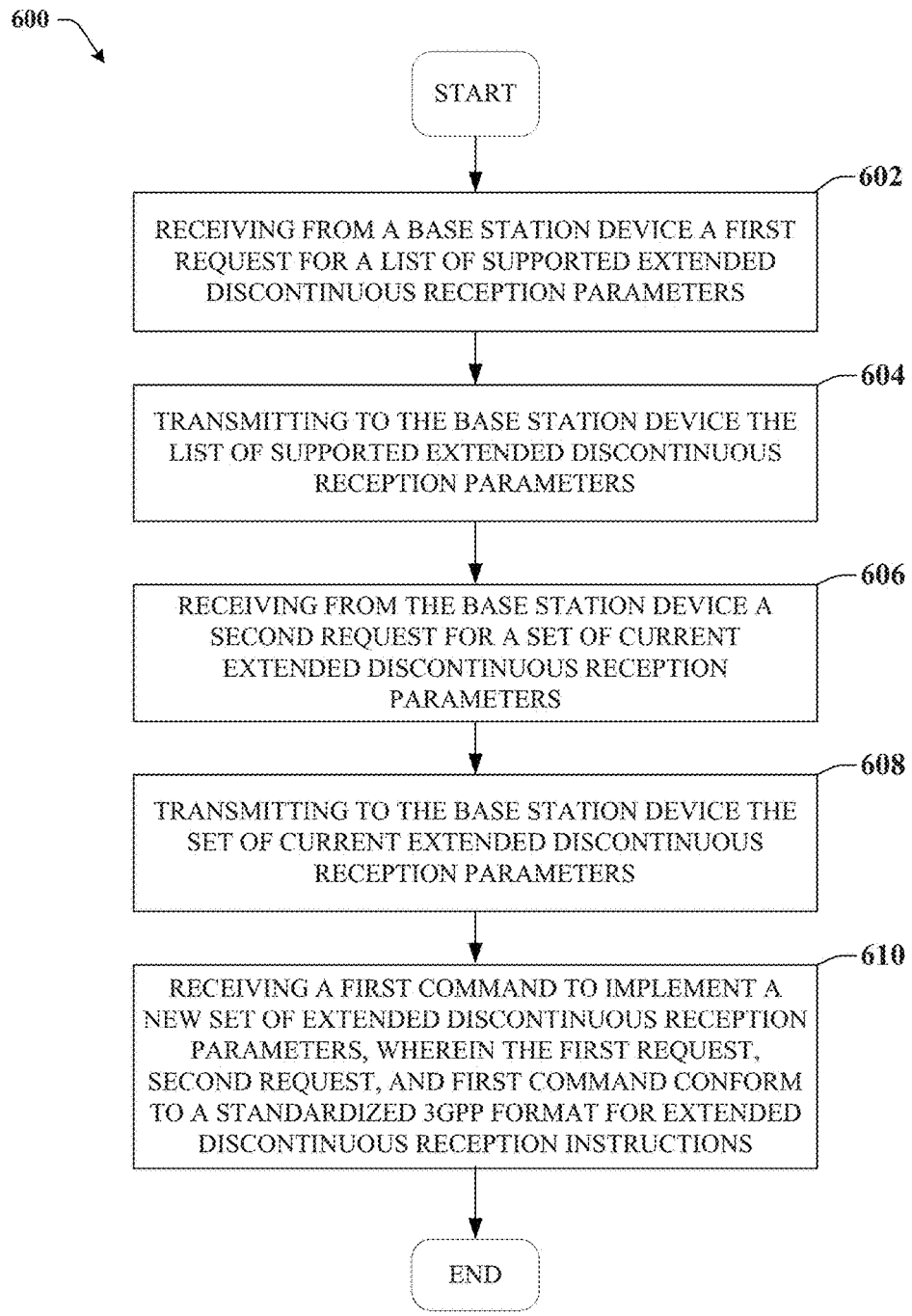
FIG. 6 illustrates an example method for receiving queries and commands related to extended idle mode discontinuous reception in accordance with various aspects and embodiments of the subject disclosure.
Figure 7:
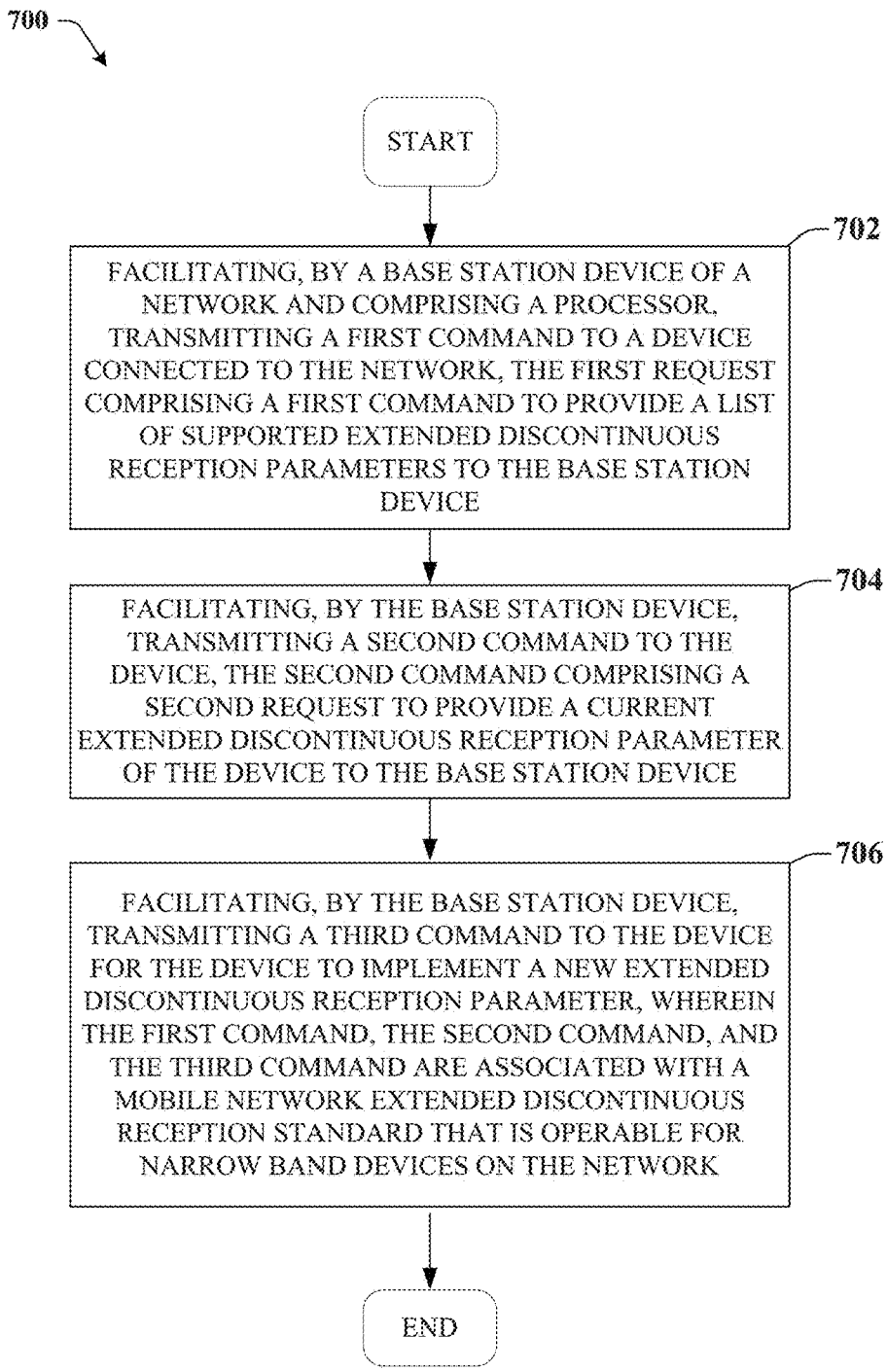
FIG. 7 illustrates an example method for transmitting queries and commands related to extended idle mode discontinuous reception in accordance with various aspects and embodiments of the subject disclosure.
Figure 8:
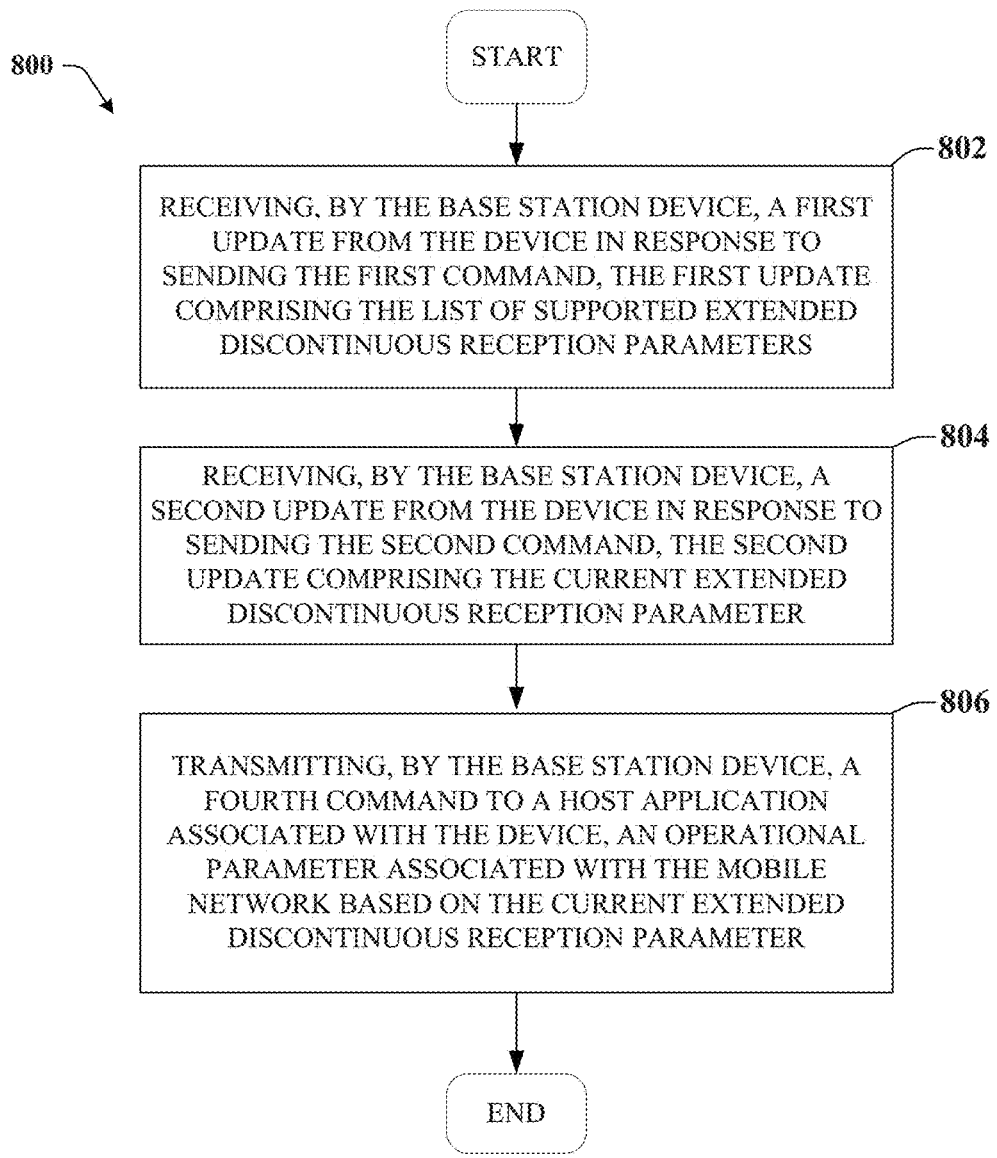
FIG. 8 illustrates an example method for receiving queries and commands related to extended idle mode discontinuous reception in accordance with various aspects and embodiments of the subject disclosure.

FIGS. 6-8 illustrates a process in connection with the aforementioned systems. The process in FIGS. 6-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example method 600 for receiving queries and commands related to extended idle mode discontinuous reception in accordance with various aspects and embodiments of the subject disclosure.

At 602, the method can include receiving from a base station device a first request for a list of supported extended discontinuous reception parameters.

At 604, the method can include transmitting to the base station device the list of supported extended discontinuous reception parameters.

At 606, the method can include receiving from the base station device a second request for a set of current extended discontinuous reception parameters.

At 608, the method can include transmitting to the base station device the set of current extended discontinuous reception parameters.

At 610, the method can include receiving a first command to implement a new set of extended discontinuous reception parameters, wherein the first request, second request, and first command conform to a standardized 3GPP format for extended discontinuous reception instructions.

FIG. 7 illustrates an example method 700 for transmitting queries and commands related to extended idle mode discontinuous reception in accordance with various aspects and embodiments of the subject disclosure Method 700 can begin at 702 wherein the method includes facilitating, by a base station device of a network and comprising a processor, transmitting a first command to a device connected to the network, the first request comprising a first command to provide a list of supported extended discontinuous reception parameters to the base station device.

At 704, the method can include facilitating, by the base station device, transmitting a second command to the device, the second command comprising a second request to provide a current extended discontinuous reception parameter of the device to the base station device.

At 706, the method can include facilitating, by the base station device, transmitting a third command to the device for the device to implement a new extended discontinuous reception parameter, wherein the first command, the second command, and the third command are associated with a mobile network extended discontinuous reception standard that is operable for narrow band devices on the network.

FIG. 8 illustrates an example method 800 for receiving queries and commands related to extended idle mode discontinuous reception in accordance with various aspects and embodiments of the subject disclosure.

At 802, the method can include receiving, by the base station device, a first update from the device in response to sending the first command, the first update comprising the list of supported extended discontinuous reception parameters.

At 804, the method can include receiving, by the base station device, a second update from the device in response to sending the second command, the second update comprising the current extended discontinuous reception parameter.

At 806, the method can include transmitting, by the base station device, a fourth command to a host application associated with the device, an operational parameter associated with the mobile network based on the current extended discontinuous reception parameter.

Figure 9:
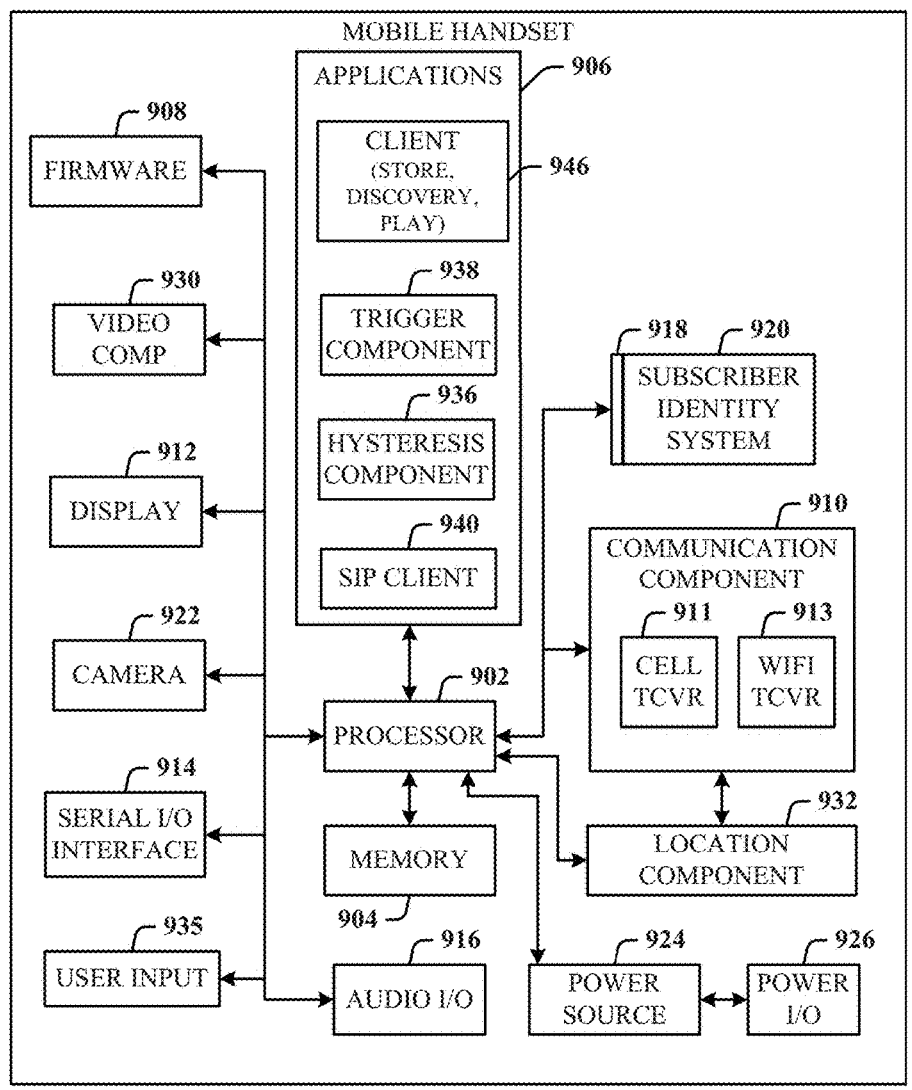
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM)

or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
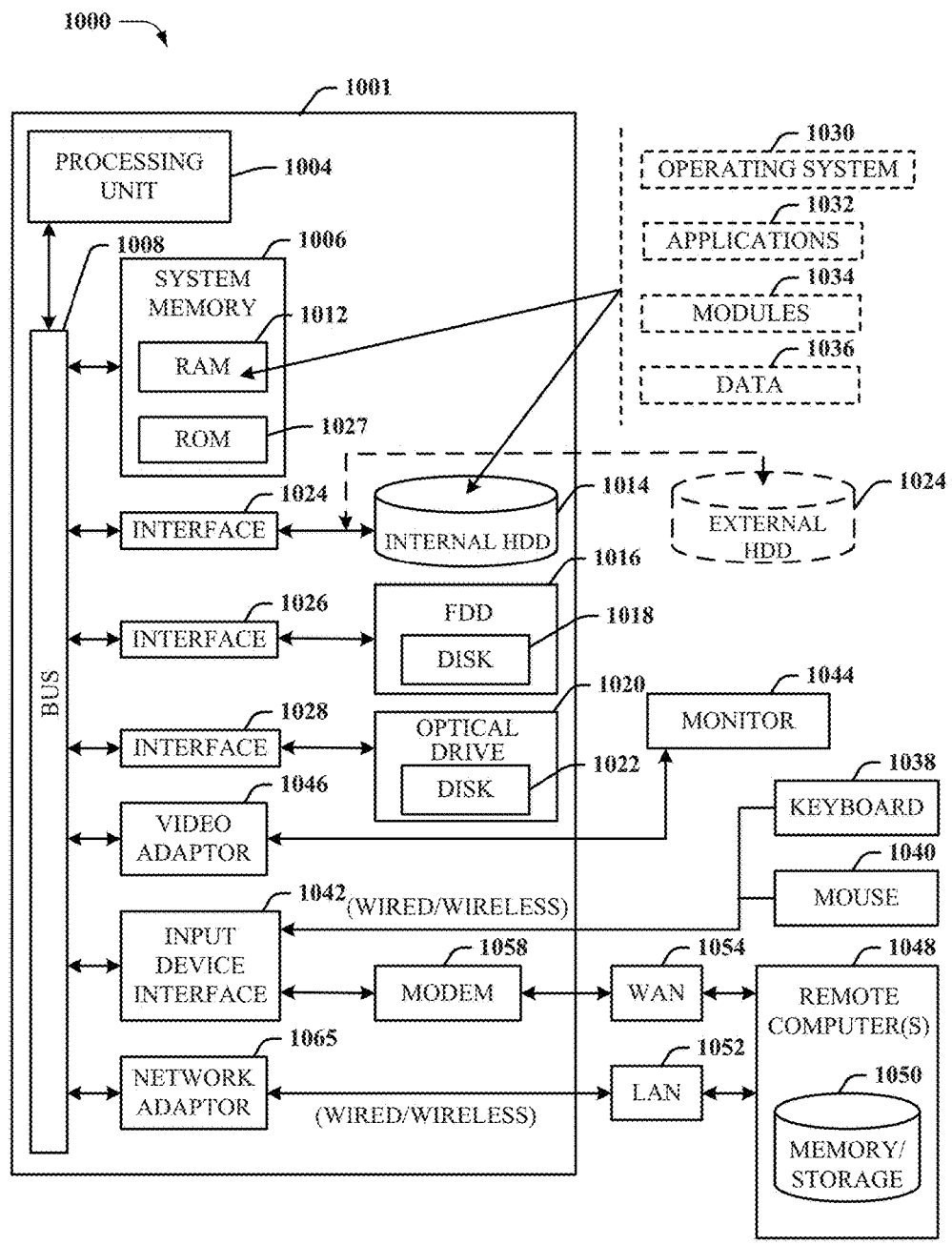
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infra-red and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, comprising:
   sending a first extended discontinuous reception command to a device on a network, the first extended discontinuous reception command comprising a first request for a group of supported extended discontinuous reception parameters;
   receiving a first update from the device in response to the sending the first extended discontinuous reception command, the first update comprising the group of supported extended discontinuous reception parameters;
   sending a second extended discontinuous reception command to the device on the network, the second extended discontinuous reception command comprising a second request for a current extended discontinuous reception parameter;
   receiving a second update from the device in response to the sending the second extended discontinuous reception command, the second update comprising the current extended discontinuous reception parameter; and
   sending a third extended discontinuous reception command to the device on the network, the third extended discontinuous reception command comprising a command to implement a new extended discontinuous reception parameter of the group of supported extended discontinuous reception parameters to replace the current extended discontinuous reception parameter.

2. The system of claim 1, wherein the device is a NB-IOT device.

3. The system of claim 1, wherein the group of supported extended discontinuous reception parameters comprises a first field comprising information associated with a group of extended discontinuous reception modes, a second field comprising information associated with a group of paging time window parameters, and a third field comprising information associated with a group of extended discontinuous reception time parameters.

4. The system of claim 3, wherein the group of paging time window parameters is between 128 seconds and 4,096 seconds.

5. The system of claim 3, wherein the group of extended discontinuous reception time parameters is between 5 seconds and 10,800 seconds.

6. The system of claim 1, wherein the current extended discontinuous reception parameter comprises at least one of a group of parameters, the group of parameters comprising a current extended discontinuous reception mode, a current paging time window, and a current extended discontinuous reception time parameter.

7. The system of claim 1, wherein the first command, second command, and third command are AT commands.

8. The system of claim 1, wherein the first command, the second command, and the third command conform to a standardized protocol for extended discontinuous reception instructions, and wherein the standardized protocol is applicable to any device attached to a network device of network devices of a network that supports implementation of the standardized protocol.

9. The system of claim 1, wherein the device is a 3GPP Category M1 device.

10. A method, comprising:
facilitating, by a base station device of a network and comprising a processor, transmitting a first command to a device connected to the network, the first command comprising a first command to provide a list of supported extended discontinuous reception parameters to the base station device;
facilitating, by the base station device, receiving a first update from the device in response to sending the first command, the first update comprising the list of supported extended discontinuous reception parameters;
facilitating, by the base station device, transmitting a second command to the device, the second command comprising a second request to provide a current extended discontinuous reception parameter of the device to the base station device;
facilitating, by the base station device, receiving a second update from the device in response to sending the second command, the second update comprising the current extended discontinuous reception parameter; and
facilitating, by the base station device, transmitting a third command to the device for the device to implement a new extended discontinuous reception parameter, wherein the first command, the second command, and the third command are associated with a mobile network extended discontinuous reception standard that is operable for narrow band devices on the network.

11. The method of claim 10, wherein the device is a NB-IOT.

12. The method of claim 10, wherein the device is a 3GPP Category M1 device.

13. The method of claim 10, wherein the list of supported extended discontinuous reception parameters comprises a first field comprising information associated with a list of extended discontinuous reception modes, a second field comprising information associated with a list of paging time window parameters, and a third field comprising information associated with a list of extended discontinuous reception time parameters.

14. The method of claim 10, further comprising:
facilitating, by the base station device, transmitting a fourth command to a host application associated with the device, an operational parameter associated with the network based on the current extended discontinuous reception parameter.

15. A non-transitory machine-readable storage medium, comprising executable instructions that, when executed by a processor of a device, facilitate performance of operations, comprising:
receiving from a base station device a first request for supported extended discontinuous reception parameters;
transmitting to the base station device the supported extended discontinuous reception parameters;
receiving from the base station device a second request for a current extended discontinuous reception parameter;
transmitting to the base station device the current extended discontinuous reception parameter; and
receiving a first command to implement a new extended discontinuous reception parameter, wherein the first request, the second request, and the first command conform to a standardized protocol for extended discontinuous reception instructions.

16. The non-transitory machine-readable storage medium of claim 15, wherein the supported extended discontinuous reception parameters comprise a first field comprising first information associated with extended discontinuous reception modes, a second field comprising second information associated with paging time window parameters, and a third field comprising third information associated with extended discontinuous reception time parameters.

17. The non-transitory machine-readable storage medium of claim 15, wherein the current extended discontinuous reception parameter comprises a current extended discontinuous reception mode, a current paging time window, and a current extended discontinuous reception time parameter.

18. The non-transitory machine-readable storage medium of claim 16, wherein the paging time window parameters are between 128 seconds and 4,096 seconds.

19. The non-transitory machine-readable storage medium of claim 17, wherein the extended discontinuous reception time parameters are between 5 seconds and 10,800 seconds.

20. The non-transitory machine-readable storage medium of claim 17, wherein the first request, second request, and first command are AT commands.

* * * * *